Patented Mar. 9, 1937

2,073,470

UNITED STATES PATENT OFFICE 2,073,470

MONO AZO DYESTUFFS

Richard Fleischhauer, Frankfort-on-the-Main-Fechenheim, Germany, assignor to General Aniline Works, Inc., New York, N. Y., a corporation of Delaware No Drawing. Application November 7, 1935, Serial No. 48,672. In Germany November 9, 1934

4 Claims. (Cl. 260—92)

My present invention relates to new mono azo dyestuffs. These dyestuffs correspond to the general formula:

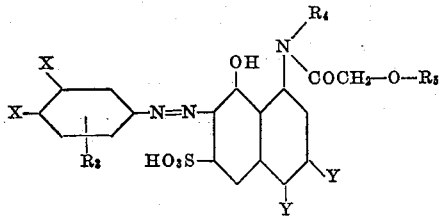

in which formula one X stands for hydrogen and the other for the radicle

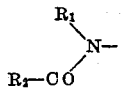

$R_1$ standing for a member of the group consisting of alkyl containing more than 2 carbon atoms, cycloalkyl, aralkyl and aryl radicals of the benzene series, $R_2$ standing for a member of the group consisting of alkyl, alkoxy, cycloalkyl and aryl radicals of the benzene series, in which formula $R_3$ means a member of the group consisting of hydrogen methyl, chlorine and sulfonic acid group, one Y stands for hydrogen and the other for a sulfonic acid group, $R_4$ stands for a member of the group consisting of hydrogen and alkyl and $R_5$ stands for a member of the group consisting of alkyl containing more than 3 carbon atoms, cycloalkyl and aryl radicals of the benzene series.

These dyestuffs are obtained by diazotizing an acylamino-arylamine containing the aforesaid radicals $R_1$, $R_2$, $R_3$ and combining the diazo compound with an 1-acylamino-8-hydroxy-naphthalene-disulfonic acid containing the aforesaid radicals $R_4$ and $R_5$.

Suitable diazo components are for instance those acylamino-arylamines containing as substituent of the acylated amino group (radical $R_1$ of the above formula) cyclohexyl, a methyl-cyclohexyl, butyl, isobutyl, amyl, benzyl, phenyl and containing as acyl group, acetyl, propionyl, butyryl, alkoxyacetyl, phenoxyacetyl, ω-halogenacetyl, hexahydrobenzoyl, benzoyl, methoxycarbonyl ($-COOCH_3$), ethoxycarbonyl ($-COOC_2H_5$).

Suitable combining components are for instance: 1-phenoxyacetyl-amino-8-hydroxy-naphthalene-4,6-disulfonic acid, its derivatives containing in the phenyl radical methyl, chloro or nitro, 1-n-butoxyacetylamino- or 1-cyclohexyloxyacetylamino- 8 -hydroxy-naphthalene-3, 6- or 4,6-disulfonic acid.

The present new monoazodyestuffs dye fibers, especially wool or silk, bright scarlet shades of a good fastness to light, washing and fulling. They may also be used for the manufacture of color lakes.

In order to further illustrate my invention the following examples are given, the parts being by weight and all temperatures in centigrade degrees, but it is to be understood, that my invention is not limited to the particular products nor reacting conditions mentioned therein.

Example 1

23.2 parts of 1-cyclohexyl-acetylamino-4-aminobenzene are diazotized in the usual manner. The diazo solution obtained is allowed to flow into a solution of 44 parts of 1-n-butoxyacetylamino-8-naphthol-4,6-disulfonic acid containing an excess of sodium carbonate.

The isolated dyestuff represents when dry a red powder, which dissolves in water and dyes wool from an acid bath very clear scarlet-red shades of an excellent fastness to washing, fulling and light. It corresponds to the formula:

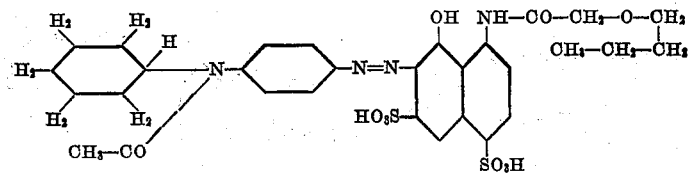

Similar dyestuffs are obtained by starting from 1-amyloxy- (or cyclohexyloxy)-acetylamino-8-naphthol-4,6-disulfonic acid.

Example 2

23.2 parts of 1-cyclohexyl-acetylamino-4-amino-benzene are diazotized in the usual manner. The diazo solution obtained is allowed to flow into a solution of 50 parts of 1(o-chlorophenoxy-acetylamino)-8-naphthol-4,6-disulfonic acid containing an excess of sodium carbonate. After heating the mass the dye-stuff obtained is isolated by filtration. It represents when dry a red powder soluble in water and dyes wool and silk bright scarlet shades of an excellent fastness to sea-water, fulling, perspiration and light. It corresponds to the formula:

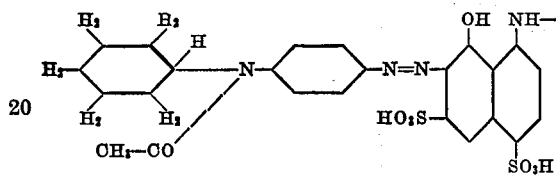

By using instead of the mentioned diazo component the equivalent amount of 1-cyclohexyl-benzoylamino-4-amino-benzene, or instead of the coupling component the 1(para- or ortho-methylphenoxy-acetylamino)-8-naphthol-4,6-disulfonic acid, dyestuffs of a more bluish tint and similar properties are obtained.

Similar dyestuffs, which are likewise distinguished by excellent fastness properties and bright shades, are obtained by using the following diazo components:

1-p-methylcyclohexyl-acetylamino-4-aminobenzene 1-o-methylcyclohexyl-acetylamino-3-aminobenzene 1-cyclohexyl-methoxy-acetylamino-4-aminobenzene 1-cylohexyl-phenoxy-acetylamino-4-aminobenzene 1-cyclohexyl-propionylamino-4-aminobenzene 1-cyclohexyl-chloroacetylamino-4-amino-benzene 1-cyclohexyl-carbethoxyamino-4-amino-benzene 1-cyclohexyl-acetylamino-4-aminobenzene-2-sulfonic acid.

Example 3

20.6 parts of 1-n-butyl-acetylamino-4-aminobenzene are diazotized and the diazo solution obtained is allowed to run into a solution of 50 parts of 1-(2'-chlorophenoxy-acetyl-amino)-8-naphthol-4,6-disulfonic acid.

The dyestuff is precipitated by heating the mass and by the addition of common salt. The precipitate is isolated by filtration and represents when dry a red powder, which dissolves in water and dyes wool and silk bright scarlet shades of a very good fastness to washing, fulling and light. The dyestuff corresponds to the formula:

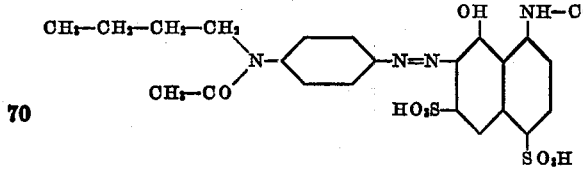

By using 1-isobutyl-acetylamino-4-aminobenzene, 1-n-butyl-acetylamino-4-amino-2-(or -3-)-methylbenzene, 1-propyl-acetylamino-3-aminobenzene, 1-benzyl-acetylamino-4-aminobenzene, 1-phenyl-acetylamino-4-aminobenzene, 1-amyl-acetylamino-4-aminobenzene, very similar dyestuffs are obtained.

The analogous dyestuff derived from 1-cyclohexyl-acetylamino-4-aminobenzene and the same coupling component yields scarlet shades of a still more yellowish tint.

Instead of 1-(2'-chlorphenoxyacetyl-amino)-8-naphthol-4,6-disulfonic acid, other phenoxyacetylamino-8-naphthol-4,6-disulfonic acids which are substituted in the phenyl nucleus, or their N-alkyl derivatives, for instance 1-(2'-chlorphenoxyacetyl-ethylamino)-8-naphthol-4,6-disulfonic acid, may be employed, whereby the shades become somewhat more yellowish or bluish.

Dyestuffs having the same qualities, but more bluish shades, are obtained by using as coupling components the analogous derivatives of the 1-amino-8-naphthol-3,6-disulfonic acid.

I claim:

1. The mono azo dyestuffs of the general formula:

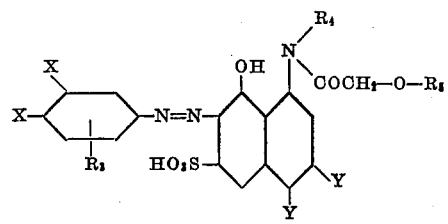

in which formula one X stands for hydrogen and the other for the radicle

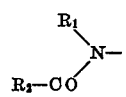

$R_1$ standing for a member of the group consisting of alkyl containing more than 2 carbon atoms, cycloalkyl, aralkyl and aryl radicles of the benzene series, $R_2$ standing for a member of the group consisting of alkyl, alkoxy, cycloalkyl and aryl radicles of the benzene series, in which formula $R_3$ means a member of the group consisting of hydrogen methyl, chlorine and sulfonic acid group, one Y stands for hydrogen and the other for a sulfonic acid group, $R_4$ stands for a member

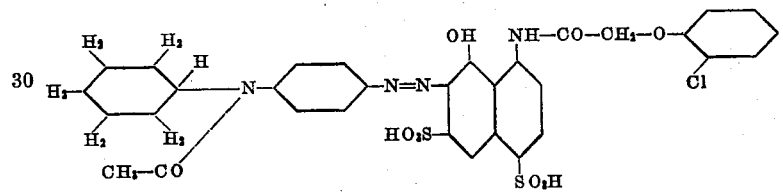

of the group consisting of hydrogen and alkyl and $R_5$ stands for a member of the group consisting of alkyl containing more than 3 carbon atoms, cycloalkyl and aryl radicals of the benzene series, which dyestuffs dye the fibers scarlet shades of a good fastness to light, washing and fulling.

2. The mono azo dyestuff of the formula:

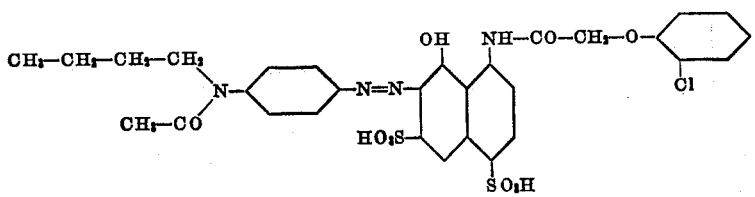

which dyestuff represents a red powder soluble in water dyeing wool and silk bright scarlet shades of a very good fastness to sea water, fulling, perspiration and light.

3. The mono azo dyestuff of the formula:

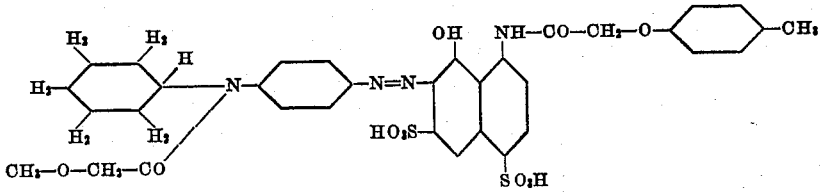

which dyestuff represents a red powder soluble in water dyeing wool and silk bright red shades of a very good fastness to sea water, fulling, perspiration and light.

4. The mono azo dyestuff of the formula:

which dyestuff represents a red powder soluble in water dyeing wool and silk bright scarlet shades of a very good fastness to washing, fulling and light.

RICHARD FLEISCHHAUER.